US010523292B2

(12) United States Patent
Schwent et al.

(10) Patent No.: US 10,523,292 B2
(45) Date of Patent: Dec. 31, 2019

(54) CLOSED LOOP TUNING OPERATION WITH ANTENNA SWITCHING (71) Applicant: MOTOROLA MOBILITY LLC, Chicago, IL (US)

(72) Inventors: Dale Schwent, Schaumburg, IL (US); Gregory Black, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 389 days.

(21) Appl. No.: 15/215,802

(22) Filed: Jul. 21, 2016

(65) Prior Publication Data

US 2018/0026373 A1 Jan. 25, 2018

(51) Int. Cl.
H04B 7/06 (2006.01)
(52) U.S. Cl.
CPC .................. H04B 7/0604 (2013.01)
(58) Field of Classification Search
CPC .......... H01Q 1/243; H01Q 21/28; H01Q 3/24; H01Q 7/005; H04B 7/0604; H04B 7/0825
See application file for complete search history.

(56) References Cited

U.S. PATENT DOCUMENTS

| 3,939,422 A * | 2/1976 | Deise ...................... H01F 21/02 375/304 |
| 8,626,083 B2 * | 1/2014 | Greene ................... H01Q 5/314 315/151 |
| 8,761,698 B2 | 6/2014 | Langer |
| 9,241,050 B1 * | 1/2016 | Asrani ................... H04M 1/026 |
| 2004/0001556 A1 * | 1/2004 | Harrison .............. H04B 7/0656 375/267 |
| 2007/0093282 A1 * | 4/2007 | Chang .................. H04B 7/0608 455/575.7 |
| 2012/0112851 A1 * | 5/2012 | Manssen ................. H03H 7/40 333/101 |
| 2013/0040581 A1 * | 2/2013 | Alberth ................ H04B 7/0602 455/70 |
| 2013/0322562 A1 * | 12/2013 | Zhang .................. H04B 7/0404 375/267 |
| 2016/0173172 A1 * | 6/2016 | Greene ................ H04B 7/0404 455/562.1 |
| 2017/0346178 A1 * | 11/2017 | Shi ........................ H04B 17/102 |
| 2018/0262257 A1 * | 9/2018 | Greene ................ H04B 7/0404 |

* cited by examiner

Primary Examiner — Lewis G West
(74) Attorney, Agent, or Firm — Yudell Isidore PLLC (57) ABSTRACT A method for detecting, at a controller of an electronic device, when an antenna switch condition associated with at least one of a first antenna and a second antenna occurs, and for responding to the antenna switch condition. The electronic device is configured with the first antenna assigned to a primary antenna path and the second antenna assigned to a secondary antenna path. In response to detecting that the antenna switch condition has occurred, a first antenna switch operation is triggered. The switch operation assigns the first antenna to the secondary antenna path and the second antenna to the primary antenna path. The method further includes performing a transmission close loop tuning on the second antenna and detecting completion of the transmission close loop tuning on the second antenna. In response to detecting completion of the transmission close loop tuning, a second antenna switch operation is executed.

20 Claims, 5 Drawing Sheets

CLOSED LOOP TUNING OPERATION WITH ANTENNA SWITCHING

BACKGROUND

1. Technical Field

The present disclosure generally relates to antennas and in particular to a method for closed loop tuning of antennas within electronic devices.

2. Description of the Related Art

The technology involved in the design of mobile communication devices is constantly improving. Mobile devices, such as wireless handsets, no longer operate solely as cellular devices, but typically also support non-cellular services such as mobile television, Bluetooth, wireless-local-area-network (WLAN), and Global Positioning System (GPS) applications. Configuring the device to support additional functionality/services with corresponding integral components, such as cameras, keyboards, and thin handsets, leave little space for the antenna. Due to the evolving technological features of mobile devices, antennas are typically wrapped and shaped to accommodate obscure paths, causing the antennas to lose efficiency. Some of this lost performance can be recovered with antenna tuning.

In mobile devices with an antenna switch architecture and closed loop tuning, there are two antennas, a first transmit-receive antenna and a second receive antenna. Closed loop tuning only occurs on the transmit-receive antenna, but due to the antenna switch architecture, the first antenna may switch to receive only, and the second antenna to transmit-receive. When this switching occurs closed loop tuning may now be done on the second antenna, while the first antenna will hold the last closed loop tuning state. Often, when antenna loading changes on the first receive antenna after a switch has occurred, the switch prompt is not immediately responsive to the loading change, resulting in degraded performance of the first receive antenna. The previously held tuning state from when the first receive antenna was heavily loaded is not ideal for lighter load conditions, and the antenna continues to be increasingly detuned as the load decreases. Consequently, the first receive antenna experiences performance degradation when antenna tuning is delayed. The degradation continues until the antenna loading conditions change sufficiently enough to cause a switch back to the path in which the transmit-receive operation is on the first antenna, allowing the first antenna to again be tuned.

BRIEF DESCRIPTION OF THE DRAWINGS

The description of the illustrative embodiments is to be read in conjunction with the accompanying drawings, wherein.

DETAILED DESCRIPTION

Disclosed are a method for detecting and triggering antenna tuning, at a controller of an electronic device, when an antenna switch condition associated with at least one of a first antenna and a second antenna occurs. The electronic device is configured with the first antenna assigned to a primary antenna path and the second antenna assigned to a secondary antenna path. In response to detecting that the antenna switch condition has occurred, a first antenna switch operation is triggered. The first antenna switch operation assigns the first antenna to the secondary antenna path and the second antenna to the primary antenna path. The method further includes performing a transmission close loop tuning on the second antenna and detecting completion of the transmission close loop tuning on the second antenna. In response to detecting completion of the transmission close loop tuning, a second antenna switch operation is executed, which re-assigns the first antenna to the primary antenna path and the second antenna to the secondary antenna path.

The above presents a general summary of several aspects of the disclosure in order to provide a basic understanding of at least some aspects of the disclosure. Other systems, methods, functionality, features and advantages of the claimed subject matter will be or will become apparent to one with skill in the art upon examination of the following figures and detailed written description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
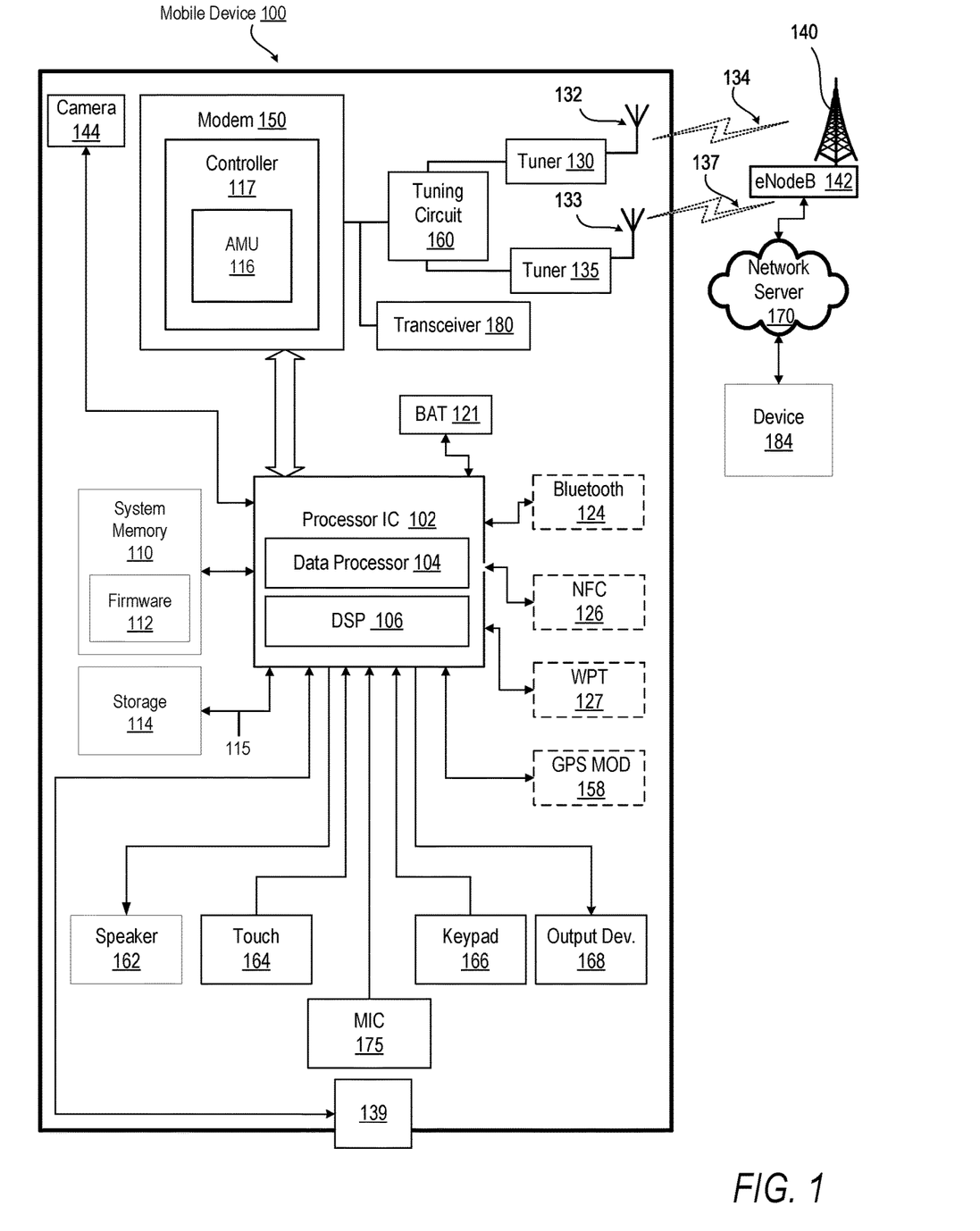
FIG. 1 illustrates a mobile device within which certain aspects of the disclosure can be practiced, in accordance with one or more embodiments.

With reference now to the figures, and beginning with FIG. 1, there is depicted an example mobile device 100, within which one or more of the described features of the various embodiments of the disclosure can be implemented. In one embodiment, mobile device 100 can be any electronic device such as, but not limited to, a notebook computer, mobile phone, smart watch, camera, video recorder, or tablet.

Mobile device 100 includes at least one processor integrated circuit (IC) 102. Included within processor IC 102 are data processor 104 and digital signal processor (DSP) 106. Processor IC 102 is coupled to system memory 110 and non-volatile storage 114 via a system communication mechanism, such as system interconnect 115. System interconnect 115 can be interchangeably referred to as a system bus, in one or more embodiments. System interconnect 115 is utilized to connect at least one component to processor IC 102. One or more software and/or firmware modules can be loaded into system memory 110 during operation of mobile device 100. Specifically, in one embodiment, system memory 110 can include therein a plurality of such modules, including firmware (F/W) 112. System memory 110 may also include basic input/output system and an operating system (not shown). The software and/or firmware modules provide varying functionality when their corresponding program code is executed by data processor 104 or by secondary processing devices within mobile device 100.

Processor IC 102 supports connection by and processing of signals from one or more connected input devices, such as touch sensor 164, microphone 175, and keypad 166, and one or more connected output devices, such as speaker 162 and output device 168 (e.g. a display). Additionally, in one or more embodiments, one or more device interfaces 139, such as an optical reader, a universal serial bus (USB), a card reader, Personal Computer Memory Card International Association (PCMIA) slot, and/or a high-definition multimedia interface (HDMI), can be associated with mobile device 100. Mobile device 100 also contains a power source such as battery 121 that supplies power to mobile device 100. Battery 121 temporarily couples to an external power source which recharges battery 121, enabling battery 121 to supply the power to mobile device 100.

Mobile device 100 further includes modem 150, Bluetooth transceiver 124, and global positioning system module (GPS MOD) 158, all of which are in communication with processor IC 102. Modem 150, Bluetooth transceiver 124, near field communication (NFC) device 126, wireless power transfer (WPT) device 127, and GPS MOD 158 enable mobile device 100 and/or components within mobile device 100 to communicate and/or interface with other devices, services, and components that are located external to mobile device 100. As a wireless device, mobile device 100 can transmit data over a wireless network. In one embodiment, mobile device 100 may connect to one or more external devices, such as device 184 via network server 170.

Mobile device 100 also includes tuning circuit 160 that is communicatively coupled to processor IC 102 via modem 150. Tuning circuit 160 is coupled to the antenna tuners, tuner 130 and tuner 135, which are coupled to primary antenna 132 and secondary antenna 133, respectively. Transceiver 180 allows for wide-area or local wireless communication between mobile device 100 and evolved node B (eNodeB) 142 via wireless signals 134 and 137 transmitted between mobile device and antenna 140. Mobile device 100 is capable of wide-area or local wireless communication with other mobile wireless devices or with eNodeB 142 as a part of a wireless communication network. For example, mobile device 100 can be communicatively coupled to, and in communication with, an external device, such as second device 184. Communication with second device 184 may be performed utilizing a communication path involving transceiver 180, antenna 132 (or antenna 133), over which path wireless signal 134 (or wireless signal 137) is propagated to eNodeB 142 (in association with antenna 140).

As shown in FIG. 1, mobile device 100 additionally includes controller 117 and antenna module unit (AMU) 116 within modem 150. Controller 117 is a tuner controller (or control module), configured to control tuning of primary antenna 132 and secondary antenna 133, via tuner 130 and tuner 135, respectively. AMU 116, within controller 117, provides antenna selection algorithm, which generates a selection signal to choose the proper antenna switch state. Additionally, AMU 116 provides an algorithm for selecting the tuner control values to be transmitted to tuner 130 and tuner 135.

Figure 2:
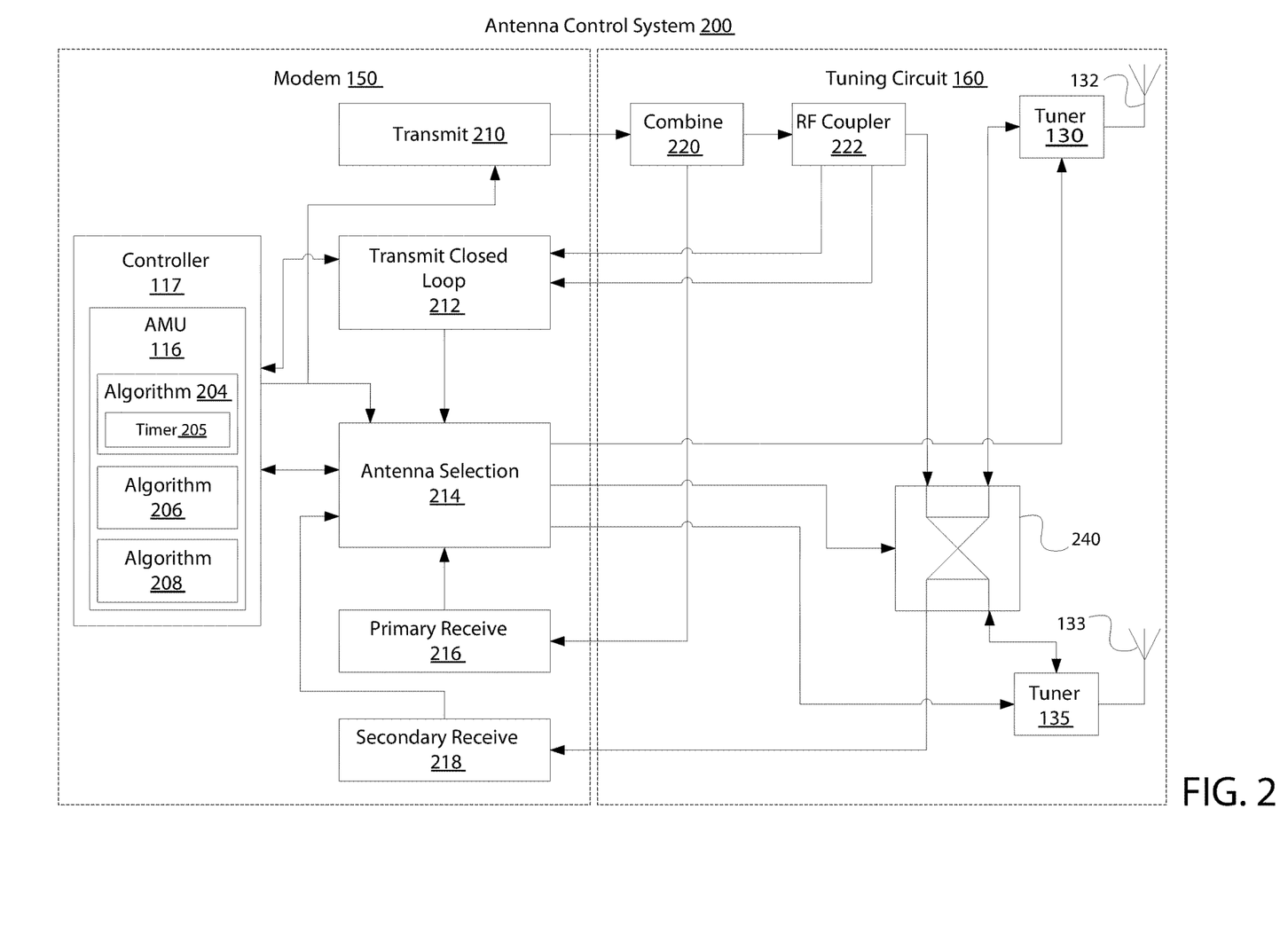
FIG. 2 illustrates a closed loop antenna tuning system with antenna switching, in accordance with one or more embodiments.

Now turning to FIG. 2 which illustrates a closed loop antenna tuning system with antenna switching. As shown, antenna control system 200 comprises modem 150 and tuning circuit 160. Within modem 150 are a tuner controller, illustrated as controller 117, transmit module 210, transmit closed loop module 212, antenna selection module 214, primary receive antenna module 216, and secondary receive module 218. AMU 116 is included within controller 117, where AMU 116 includes algorithm 204, algorithm 206, and algorithm 208. Algorithm 204 also includes timer 205. Tuning circuit 160 includes combine module 220, radio frequency (RF) coupler 222, tuner 130, tuner 135, primary antenna 132, secondary antenna 133, and antenna switch 240.

Controller 117 is connected to transmit module 210, transmit closed loop module 212, and antenna selection module 214. Transmit module 210 is connected to antenna selection module 214 and combine module 220. Transmit closed loop module 212 is also connected to RF coupler 222. Antenna selection module 214 connects to primary receive module 216, secondary receive module 218, tuner 130, tuner 135, as well as switch 240. Primary receive module 216 is connected to combine module 220. Secondary receive module 218 is connected to switch 240. Additionally, antenna switch 240 communicates with RF coupler 222, tuner 130, tuner 135, secondary receive module 218, and antenna selection module 214. As a dual antenna communication device, mobile device 100 is communicatively coupled to tuner 130, which is connected to primary antenna 132, and to tuner 135, which is connected to secondary antenna 133.

Controller 117 transmits output to, and receives input from, transmit closed loop module 212 and antenna selection module 214. Controller 117 outputs transmit (TX) power control signal to transmit module 210 and antenna selection module 214. Transmit module 210 outputs the TX radio frequency signal to combine module 220. Transmit closed loop module 212 receives a transmit forward feedback signal and a transmit reflected feedback signal from RF coupler 222, and outputs a tuner control signal to antenna selection module 214. Primary receive module 216 receives a primary receive (RX1) radio frequency input from combine module 220. Secondary receive module 218 receives a secondary receive (RX2) radio frequency input from antenna switch 240. Antenna selection module 214 receives an RX1 power signal input from primary receive module 216, and an RX2 power signal input from secondary receive module 218. Antenna selection 214 outputs a primary tuner control signal to tuner 130, a secondary tuner control signal to tuner 135, and an antenna switch control signal to switch 240. Additionally, antenna switch 240 communicates with RF coupler 222, tuner 130, and tuner 135. Specifically, antenna switch 240 receives input from RF coupler 222, tuner 130, tuner 135, and antenna selection 214, and outputs signals to tuner 130 and tuner 135.

AMU 116 comprises three components, algorithm 204, algorithm 206, and algorithm 208, which enable detection of antenna switch conditions, and triggering of antenna tuning. In operation, RX1 power signal and RX2 power signal are utilized as inputs to antenna selection 214 to determine which antenna has the better performance. In response to loading conditions increasing on antenna 132 and antenna 133, the RX1 power signal and RX2 power signal will change, dynamically triggering the TX power control signal to change. AMU 116 conditionally selects the most suitable antenna for transmit/receive operations, and initiates a switch of the antenna paths, accordingly. AMU 116 detects when an antenna switch condition, from among multiple antenna switch conditions, is detected. The correct tuner control values are forwarded to tuner 130 and tuner 135. The antenna that carries the transmit signal (TX signal) utilizes the tuner control signal output provided by transmit closed loop 212 following execution of a transmit close loop tuning algorithm. The tuner control signal is utilized as the tuner control input for the respective antenna. The antenna carrying the RX2 signal maintains the previous tuner control signal utilized when the antenna carried the TX/RX1 signal. Controller 117 provides a predetermined, default tuner value for the startup condition when secondary antenna 133 has not carried the TX/RX1 signal.

Controller 117, within modem 150, is communicatively coupled to tuning circuit 160 and includes algorithm 204, 206, and 208 of AMU 116. AMU 116 conditionally triggers tuner 130 and tuner 135 to perform a first antenna switch operation via switch 240. A primary antenna path is associated with the primary transmit/receive (TX/RX1) signal, and a secondary antenna path is associated with the RX2 signal. When the selected algorithm initiates a switch of the antenna paths, controller 117 enables transmission closed loop tuning to be performed on a corresponding one of primary antenna 132 and secondary antenna 133. Subsequent to the closed loop tuning algorithm being performed, a second antenna switch operation is executed. The second antenna switch operation re-assigns primary antenna 132 to the primary antenna path and secondary antenna 133 to the secondary antenna path.

In one embodiment, execution of algorithm 204 includes initiation of timer 205. The antenna switch condition includes expiration of a pre-defined time period assigned to timer 205. Initially, primary antenna 132 is associated with the primary antenna path, and secondary antenna 133 is associated with the secondary antenna path. The pre-defined time period is associated with an amount of time RX2 signal is on the secondary antenna path (or secondary antenna 133). Timer 205 is initiated when a period of time, which is equal to a convergence time of a transmission closed loop tuning algorithm on secondary antenna 133, has expired. When timer 205 expires, the timer controlled antenna switching algorithm, algorithm 204, switches primary antenna 132 to RX2 antenna path and secondary antenna 133 to TX/RX antenna path. The switch assigns TX/RX2 signal to secondary antenna 133 and RX2 signal to antenna 132. During execution of the closed loop tuning algorithm, tuner 130 tunes secondary antenna 133, enabling secondary antenna 133 to converge to a new optimum tune state. After secondary antenna 133 reaches the new optimum tune state, controller 117 initiates a subsequent antenna switch, enabling antenna switch 240 to assign primary antenna 132 to TX/RX1 antenna path and secondary antenna 133 is assigned to RX2 antenna path. The subsequent antenna switch re-assigns TX/RX1 signal communication to primary antenna 132 and RX2 signal communication to secondary antenna 133. In one embodiment, the time period for detecting an antenna switch condition is one second. This time period may be associated with a user's interaction with device 100. For example, movement of a user's hand in proximity to primary antenna 132 (or secondary antenna 133) is approximately one second. Therefore, in this embodiment, a pre-defined time period associated with timer 205 is one second.

In another embodiment, the antenna switch condition is associated with detection of an antenna power delta variation value between primary antenna 132 and secondary antenna 133. In this embodiment, the antenna switch condition is initiated by algorithm 206. Algorithm 206 includes the detection of the antenna power delta variation value for the RX1 signal, on primary antenna 132 and RX2 antenna signal on secondary antenna 133. In this embodiment, the initial receiver antenna power delta, delta Rx', is associated with the difference of RX1 signal power level and RX2 signal power level detected immediately after the antennas have switched. Similarly, current receiver antenna power delta, delta Rx, is associated with the difference of RX1 signal power level and RX2 signal power level detected in real-time, subsequent to the antenna switch. Additionally, RX2 signal power level may be detected in real-time, and is continuously monitored.

Further, in one embodiment, primary receive module 216 outputs the first receive signal power level, or RX1 signal power level, to antenna selection 214. Additionally, secondary receive module 218 outputs the second receive signal power level, or RX2 signal power level, to antenna selection 214. The RX1 signal power level and the RX2 signal power level are measured at a first time when an antenna switch is detected, or more specifically, at the start of a closed loop tuning algorithm. The RX1 and RX2 signal power levels are also measured at a predetermined second time subsequent to the first time when the antenna switch is detected. Antenna selection module 214 transmits the detected signal power levels to controller 117. At controller 117, algorithm 206 determines the receive signal power level variation value as an absolute value of the difference between the delta Rx' and the delta Rx. When the absolute value of the receiver antenna delta power variation is greater than a predetermined retuning threshold, as determined by algorithm 206, the antenna switch condition is satisfied, and an antenna switch is initiated. Controller 117 transmits an antenna switch request to antenna switch 240 via antenna selection module 214, and the antenna switch operation is executed.

In another embodiment, the measurements of RX1 signal power level and the RX2 signal power can be replaced with another measurement associated with mobile device 100. The receiver antenna delta power variation metric can be substituted for an alternative delta value. For example, an absolute value of a difference between a first load measurement at an external sensor (or input interface) and a second load measurement at the external sensor. The first load measurement is identified at a first time when an antenna switch is detected and the second load measurement is identified at a predetermined second time, subsequent to the antenna switch. The metric is an absolute value of a measurement change which is determined by a load difference detected at the external sensor. When the absolute value of the measurement change is greater than a predetermined retuning threshold, as determined by algorithm 206, the antenna switch condition is satisfied, and an antenna switch is initiated. In this embodiment, the external sensor is device interface 139 (of FIG. 1). The input of external devices, for example a USB, auxiliary cable, capacitive sensor, or infrared proximity detector, generate the measureable load change.

In still another embodiment, the antenna switch condition is associated with an indicator event detected at an external sensor and the antenna switch condition is initiated by algorithm 208. Algorithm 208 determines whether the indicator event occurred. For example, the indicator event can be a universal serial bus input, an auxiliary cable input, a capacitive sensor input, and an infrared proximity detection input. If the indicator event occurred, an antenna path switch is dynamically initiated.

In one embodiment, a first closed loop metric and a second closed loop metric are compared to a pre-defined metric threshold to determine when tuning of primary antenna 132 should be delayed. Example first closed loop metrics and second closed loop metrics include: an input return loss, a matching network power loss, and a pre-defined metric utilized to determine an optimum or preferred tune state for the target antenna. The first closed loop metric is recorded prior to execution of the closed loop tuning algorithm. Subsequent to completion of the closed loop tuning algorithm, the closed loop metric is recorded. The performance metric is analyzed to determine whether the previous antenna switch and execution of the closed loop tuning algorithm was necessary. When the second closed loop metric has not improved by more than a threshold value, then a determination is made that there were no significant changes to the tune state of secondary antenna 133, and thus the antenna switch and execution of the closed loop tuning algorithm were a result of changes to loading on primary antenna 132. Therefore, subsequent switching should be delayed by a predetermined time. The predetermined time is associated with a hysteresis threshold value. The determined hysteresis threshold value is obtained from changes, over time, in metrics associated with antenna control system 200, recorded in real-time as time-based values. In one embodiment, the threshold value utilized to measure a performance improvement of the antenna is a hysteresis value associated with antenna control system 200, recorded over a predetermined time span.

Figure 3:
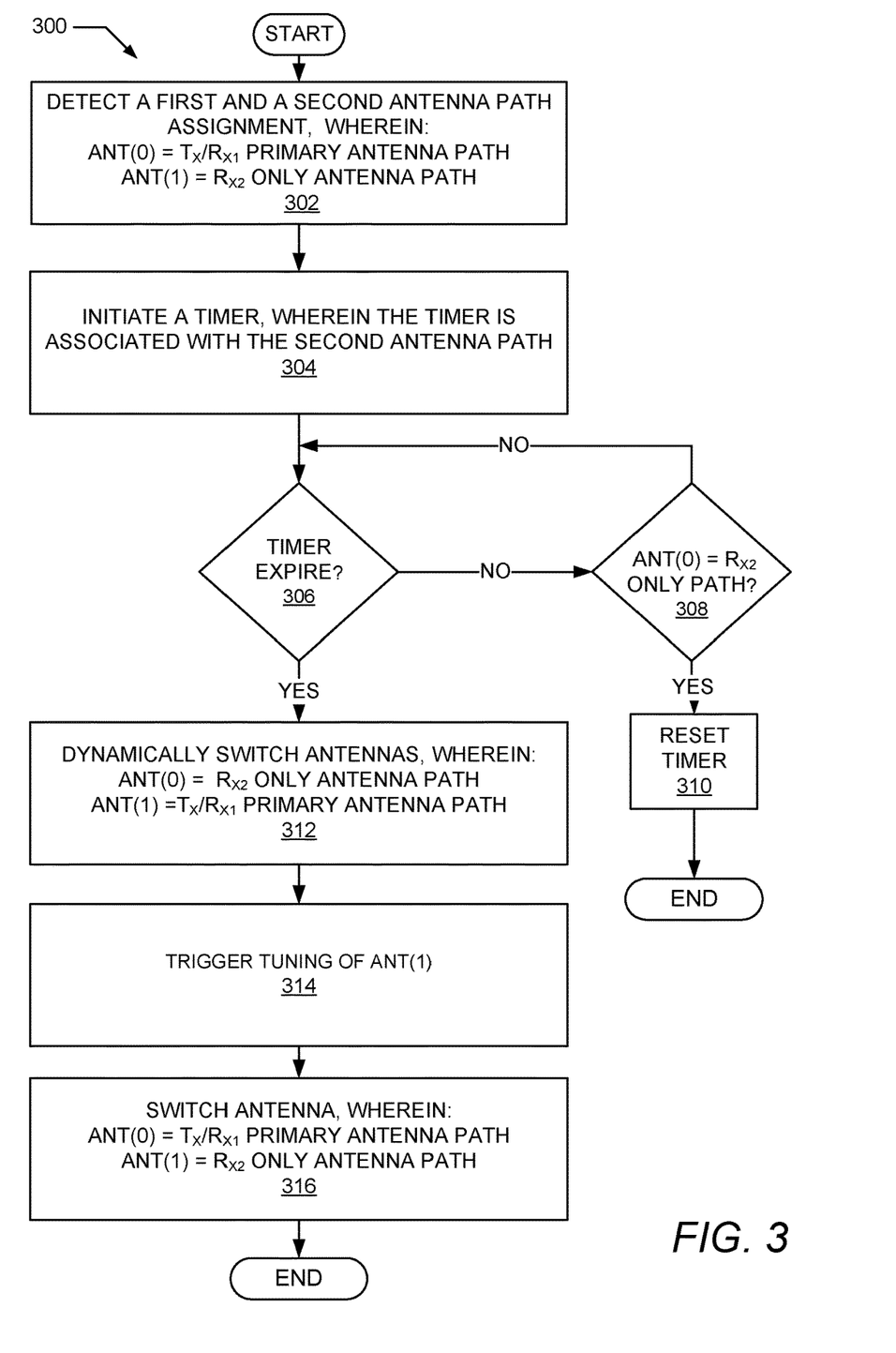
FIG. 3 is a flow chart illustrating a method for timer controlled closed loop tuning, according to one or more embodiments.
Figure 4:
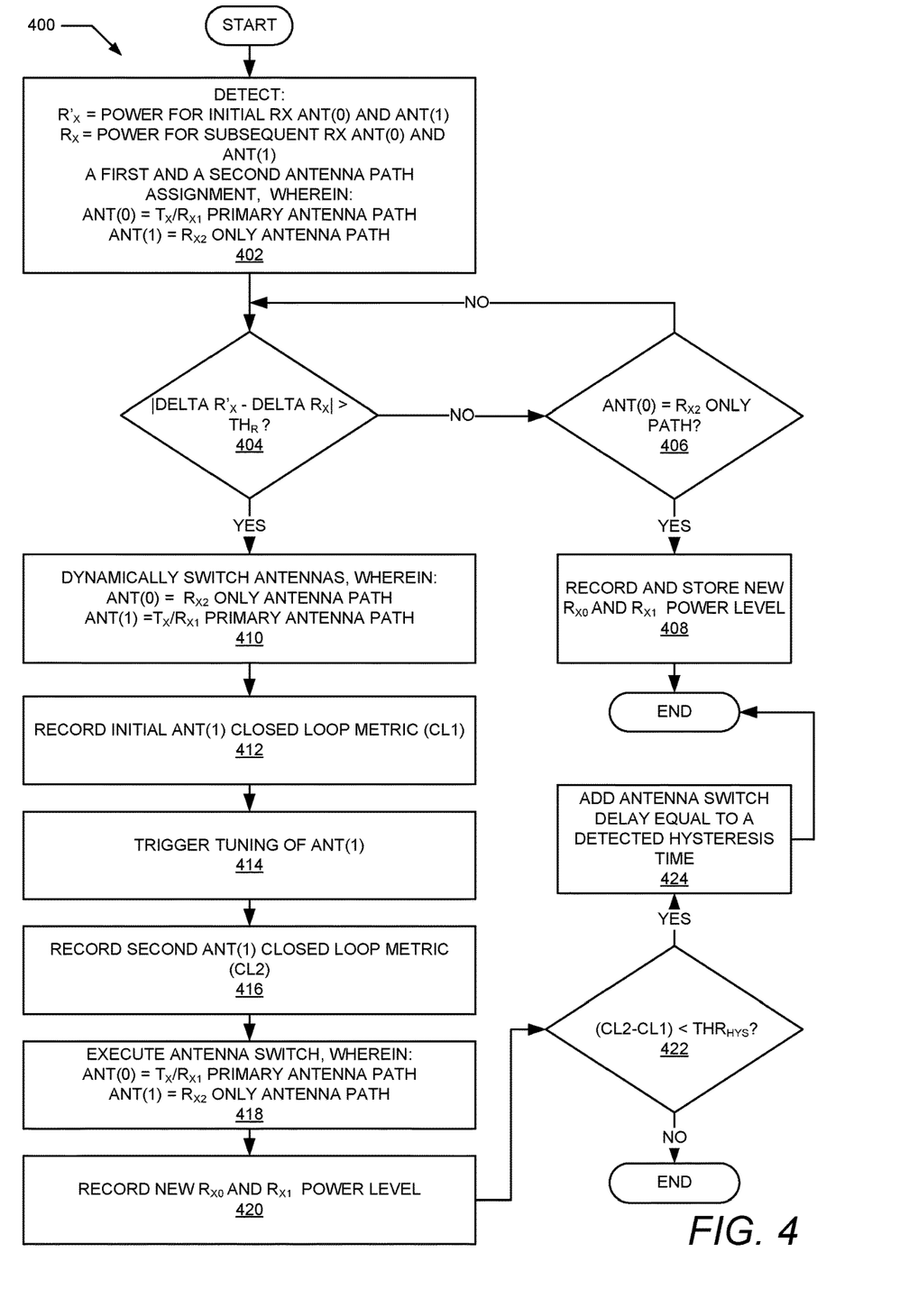
FIG. 4 is a flow chart illustrating a method for power delta variation controlled closed loop tuning, according to one or more embodiments.
Figure 5:
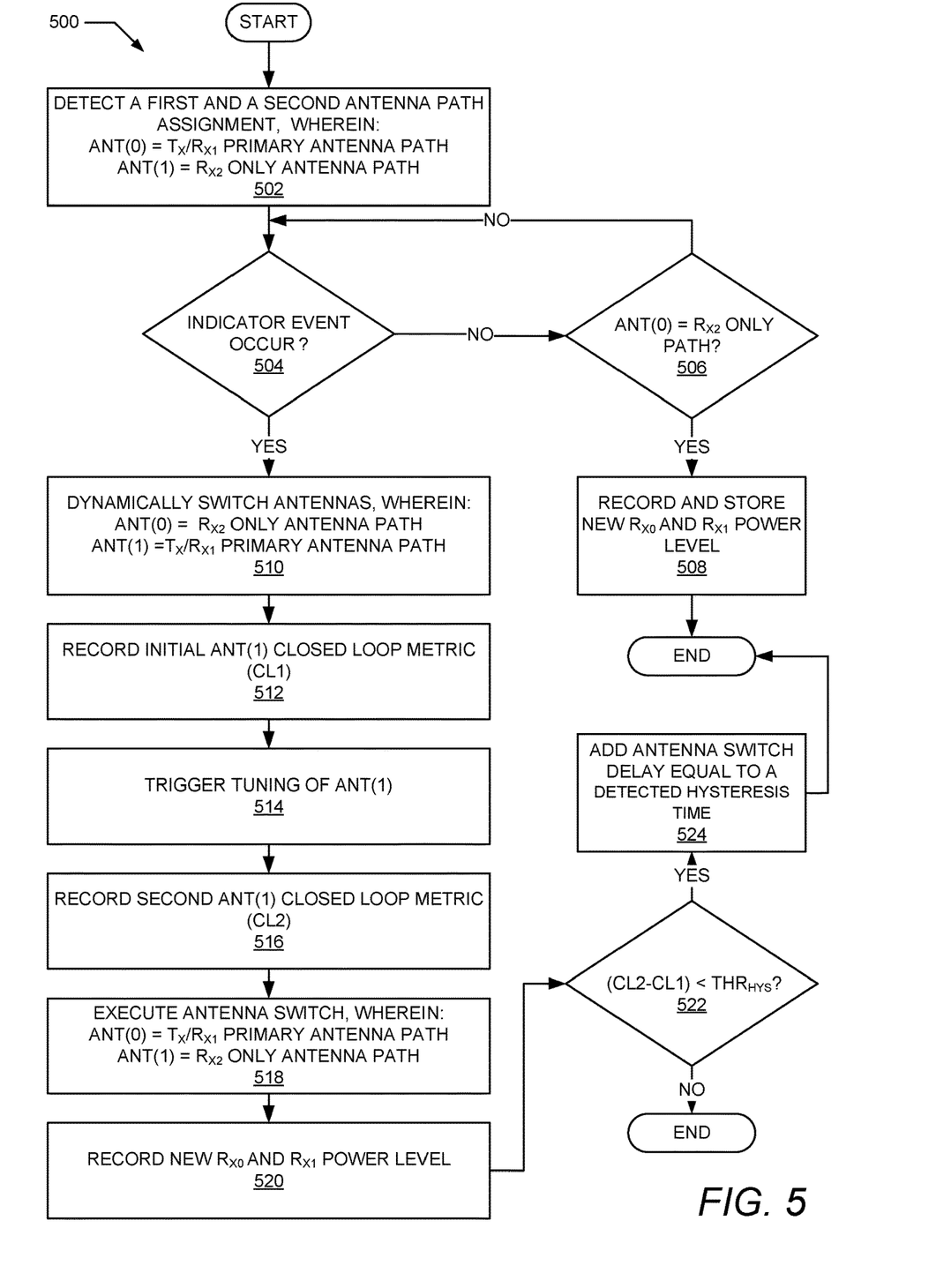
FIG. 5 is a flow chart illustrating a method for controlled closed loop tuning initiated by external sensor inputs, in accordance with one or more embodiments.

Referring now to FIGS. 3-5, there are depicted various methods for triggering a first antenna switch operation, according to multiple embodiments. Aspects of the methods are described with reference to the components of FIGS. 1-2. Several of the processes of the methods provided in FIGS. 3-5 can be implemented by processor IC 102 communicating with controller 117, executing software code of AMU 116 within a mobile device or generic data processing system. For simplicity, the methods described below are generally described as being performed by processor execution of AMU 116 and controller 117 of device 100.

Referring now to FIG. 3, there is depicted a flow chart illustrating a method for timer controlled closed loop tuning of device 100, in accordance with one or more embodiments of the present disclosure. Method 300 begins at the start block and proceeds to block 302. At block 302, a first and a second antenna path assignment are detected. Primary antenna (Ant(0)) is assigned to the TX/RX1 primary antenna path and secondary antenna (Ant(1)) is assigned to RX2 antenna path. At block 304, in response to the primary antenna being assigned to the TX/RX1 antenna path and the secondary antenna being assigned to the RX2 antenna path, a timer is initiated. The timer provides a count of a predetermined period of time, and is associated with the RX2 antenna path. The timer is monitored for detection of the elapsed time. A decision is made, at block 306, whether an elapsed time, relative to the pre-defined time period, has expired. In response to detecting the expiration of the pre-defined time period, the switch operation is dynamically triggered, switching/assigning the primary antenna to the RX2 antenna path, and concurrently switching/assigning the secondary antenna to TX/RX1 antenna path, at block 312. If the pre-defined time period has not expired, a determination is made, at block 308, whether the primary antenna is associated with the RX2 antenna path. If the antenna was prematurely switched (due to other operations of the antenna switching algorithm), such that the primary antenna is assigned to the RX2 antenna path, the timer is re-initiated (reset) at block 310. If the antenna was not prematurely switched, the method returns to block 306. At block 314, a transmission closed loop tuning algorithm is performed on the secondary antenna. When the tuning algorithm is complete, a subsequent antenna switch operation re-assigns the first antenna to the TX/RX1 antenna path and the secondary antenna to the RX2 antenna path, at block 316. The process concludes at the end block.

FIG. 4 is a flow chart illustrating a method for power delta variation controlled closed loop tuning, according to another embodiment. In method 400, the primary antenna (Ant (0)) is assigned to the primary (TX/RX1) antenna path and the secondary antenna (Ant (1)) is assigned to the secondary (RX2) antenna path. Method 400 commences at the start block, then proceeds to block 402. At block 402, the measurements of initial antenna power (Rx'), and real-time antenna power (Rx) are detected. The antenna power deltas are detected for the primary antenna and the secondary antenna. A decision is made, at block 404, whether the antenna power delta variation is greater than a predetermined power delta variation threshold. In response to the variation in the power delta being greater than the predetermined power delta variation threshold, the antennas are dynamically switched, at block 410, where the primary antenna is associated with the RX2 antenna path, and the secondary antenna is associated with the TX/RX1 antenna path. In response to the antenna power delta variation not being greater than the predetermined threshold, a determination is made at block 406, whether the primary antenna is associated with the RX2 antenna path. In response to the primary antenna being assigned to the RX2 antenna path, a primary receiver power signal level and a secondary receiver power signal level are recorded and stored, at block 408, for use in a subsequent calculation of the power delta variation. In response to the primary antenna not being associated with the RX2 antenna path, the method returns to block 404.

At block 412 a first closed loop metric (CL1) associated with the secondary antenna is recorded. The closed loop tuning algorithm is triggered for tuning the secondary antenna, at block 414. At block 416, a second close loop metric (CL2) associated with the secondary antenna is recorded. An antenna switch back is executed at block 418. The switch back assigns the primary antenna to the TX/RX1 antenna path and assigns the secondary antenna to the RX2 antenna path. At block 420, a current primary receiver power signal level and a current secondary receiver power signal level are recorded. A decision is made, at block 422, whether the value resulting from the difference of the close loop metric is less than a detected hysteresis threshold. In response to the calculated difference of the second closed loop metric and the first closed loop metric being less than a predetermined hysteresis threshold, a time span before triggering a subsequent execution of the first antenna switch operation is increased, at block 424. The time is increased by adding a time delay to postpone the subsequent execution of the first antenna switch operation. In one embodiment, the time delay is a calculated hysteresis time delay. In response to the second closed loop metric and the first closed loop metric being greater than a predetermined hysteresis threshold, the process ends.

FIG. 5 is a flow chart illustrating a method for controlled closed loop tuning initiated by external sensor inputs. Method 500 commences at the start block, then proceeds to block 502. At block 502, the primary antenna (Ant (0)), which is assigned to the primary (TX/RX1) antenna path, is detected and the secondary antenna (Ant (1)), which is assigned to the secondary (RX2) antenna path, is detected. A decision is made, at block 504, whether an indicator event has occurred. In response to the indicator event occurring, the antennas paths are dynamically switch (at block 510), where the primary antenna is associated with the RX2 antenna path, and the secondary antenna is associated with the TX/RX1 antenna path. In response to the indicator event not occurring, a determination is made, at block 506, whether the primary antenna is associated with the RX2 antenna path. In response to the first antenna being assigned to the primary antenna path, at block 508, a new primary receiver power signal level and a secondary receiver power signal level are recorded and stored for use in a subsequent power delta variation calculation. In response to the primary antenna not being associated with the RX2 antenna path, the method returns to block 504.

At block 512, an initial secondary antenna closed loop metric (CL1) is recorded. The closed loop tuning algorithm is triggered for tuning the secondary antenna, at block 514. At block 516, a second close loop metric (CL2) associated with the secondary antenna is recorded. A second antenna switch is executed at block 518. The antenna switch re-assigns the primary antenna to the TX/RX1 antenna path, and assigns the secondary antenna to the RX2 antenna path. At block 520, a new primary receiver power signal level and a secondary receiver power signal level are recorded. A decision is made, at block 522, whether the value resulting from the difference of the close loop metric is less than the detected hysteresis threshold. In response to the calculated difference of the second closed loop metric and the first closed loop metric being less than a predetermined hysteresis threshold, a time span before triggering a subsequent execution of the first antenna switch operation is increased, at block 524. The time is increased by adding a time delay to postpone the subsequent execution of the first antenna switch operation. The time delay is a calculated hysteresis time delay. In response to the second closed loop metric and the first closed loop metric being greater than a predetermined hysteresis threshold the process ends.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting, at a controller of an electronic device configured with a first antenna assigned to a primary antenna path and a second antenna assigned to a secondary antenna path, when an antenna switch condition associated with at least one of the first antenna and the second antenna occurs;
   in response to detecting that the antenna switch condition has occurred, triggering a first antenna switch operation, which assigns the first antenna to the secondary antenna path and the second antenna to the primary antenna path;
   performing a transmission close loop tuning on the second antenna, wherein during the transmission close loop tuning, a tuner tunes second antenna, enabling second antenna to converge to a new optimum tune state;
   detecting completion of the transmission close loop tuning on the second antenna; and
   in response to detecting completion of the transmission close loop tuning, where the second antenna reaches the new optimum tune state, executing a second antenna switch operation, which re-assigns the first antenna to the primary antenna path and the second antenna to the secondary antenna path.

2. The method of claim 1, wherein:
   the antenna switch condition includes an expiration of a pre-defined time period associated with an amount of time a received signal is on the secondary antenna path.

3. The method of claim 2, further comprising:
   establishing a timer having the pre-defined time period; and
   tracking a time to expiration of the pre-defined time period.

4. The method of claim 2, further comprising:
   initiating the timer in response to the first antenna being assigned to the primary antenna path and the second antenna being assigned to the secondary antenna path;
   monitoring an elapsed time relative to the pre-defined time period; and
   triggering the first antenna switch operation, in response to detecting the expiration of the pre-defined time period.

5. The method of claim 2, further comprising:
   in response to detecting the first antenna switch operation before expiration of the pre-defined time period, reinitiating the timer.

6. The method of claim 1, wherein:
   the antenna switch condition is associated with detection of a power delta associated with the first antenna and second antenna; and
   the method further comprises:
   determining a variation in the power delta over a predetermined period of time;
   identifying when the variation in the power delta exceeds a predetermined power delta variation threshold; and
   triggering the first antenna switch operation, in response to the variation in the power delta being greater than the predetermined power delta variation threshold.

7. The method of claim 6, further comprising:
identifying when the first antenna is assigned to the primary antenna path; and
in response to the first antenna being assigned to the primary antenna path, recording a primary receiver power signal level and a secondary receiver power signal level for use in a subsequent calculation of the power delta.

8. The method of claim 1, further comprising:
recording a first closed loop metric in response to execution of the first antenna switch operation;
recording a second closed loop metric subsequent to detecting completion of the transmission close loop tuning on the second antenna;
calculating a difference between the second closed loop metric and the first closed loop metric; and
in response to the calculated difference of the second closed loop metric and the first closed loop metric being less than a predetermined hysteresis threshold, increasing a time span before triggering a subsequent execution of the first antenna switch operation by adding a time delay to postpone the subsequent execution of the first antenna switch operation, where the time delay is a calculated hysteresis time delay.

9. The method of claim 8, wherein:
the first closed loop metric and second closed loop metric are each one closed loop metric from among multiple closed loop metrics comprising: an input return loss, a matching network power loss, and a predetermined metric for calculating a preferred tune state.

10. A device comprising:
a modem;
a tuning circuit;
a first tuner and a second tuner coupled to the tuning circuit and respectively coupled to a first antenna and a second antenna;
a tuner controller communicatively coupled to the modem and to the tuning circuit and which includes a control module comprising a plurality of algorithms that configure the tuning circuit to:
  detect when an antenna switch condition, from among multiple antenna switch conditions, is detected;
  trigger the first tuner and the second tuner to perform a first antenna switch operation in which the first antenna and the second antenna switch antenna paths; and
  perform a transmission close loop tuning on one of the first and the second antenna before executing a second antenna switch operation to re-assign the antenna paths to the first antenna and the second antenna, wherein during the transmission close loop tuning, a tuner tunes second antenna, enabling second antenna to converge to a new optimum tune state;
  detect completion of the transmission close loop tuning on the second antenna; and
  in response to detecting completion of the transmission close loop tuning, where the second antenna reaches the new optimum tune state, execute a second antenna switch operation, which re-assigns the first antenna to the primary antenna path and the second antenna to the secondary antenna path.

11. The device of claim 10, wherein:
the first antenna is initially assigned on a primary transmit/receive (TX/RX1) antenna path as the primary antenna path and the second antenna is initially assigned to a RX2 antenna path as the secondary antenna path; and
the antenna paths comprise a primary antenna path associated with a transmit signal and a first receive signal and a secondary antenna path associated with a second receive signal.

12. The device of claim 10, wherein the antenna switch condition includes an expiration of a pre-defined time period associated with an amount of time the second receive signal is on the secondary antenna path.

13. The device of claim 12, further comprising a timer that is initiated when a period of time equal to a convergence time of a transmission closed loop tuning algorithm on the secondary antenna path has expired.

14. The device of claim 10, wherein the antenna switch condition is associated with detection of an antenna power delta variation value of the first antenna and second antenna, when the antenna power delta variation value is an absolute value of a difference between a first receive signal power level variation and a second receive signal power level variation, where the first receive signal power level variation and the second receive signal power level variation are measured at a first time when an antenna switch is detected and at a predetermined second time subsequent to the first time when the antenna switch is detected.

15. The device of claim 10, wherein the antenna switch condition is associated with a delta value determined by a loading change detected at an external sensor, when the delta value is defined by an absolute value of a difference between a first load measurement at the external sensor and a second load measurement at the external sensor, where the first load measurement is identified at a first time when an antenna switch is detected and the second load measurement is identified at a predetermined second time, subsequent to the antenna switch.

16. The device of claim 10, wherein a first closed loop metric and a second closed loop metric are compared to a pre-defined metric threshold to determine when tuning of the first antenna should be delayed.

17. The device of claim 16, wherein the first closed loop metric and the second closed loop metric are a closed loop metric from among a group of metrics comprising:
an input return loss, a matching network power loss, and a pre-defined metric.

18. A computer program product comprising:
a computer readable storage device; and
program code on the computer readable storage device that when executed within a processor associated with a dual antenna communication device that is configured with a first antenna assigned to a primary antenna path and a second antenna assigned to a secondary antenna path, the program code enables the dual antenna communication device to provide functionality of:
  detecting, at a controller of the dual antenna communication device, when an antenna switch condition associated with at least one of the first antenna and the second antenna occurs;
  in response to detecting that the antenna switch condition has occurred:
    triggering a first antenna switch operation, which assigns the first antenna to the secondary antenna path and the second antenna to the primary antenna path;
    performing a transmission close loop tuning on the second antenna wherein during the transmission close loop tuning, a tuner tunes second antenna, enabling second antenna to converge to a new optimum tune state;

detecting completion of the transmission close loop tuning on the second antenna; and in response to detecting completion of the transmission close loop tuning, where the second antenna reaches the new optimum tune state, executing a second antenna switch operation which re-assigns the first antenna to the primary antenna path and the second antenna to the secondary antenna path.

19. The computer program product of claim 18, wherein the antenna switch condition comprises at least one of:

an expiration of a pre-defined time period when a timer, having the pre-defined time period associated with an amount of time a secondary receive signal is on the secondary antenna path, is established;

a detection of a power delta variation associated with the first antenna and second antenna, and which power delta variation is greater than a predetermined power delta variation threshold; and an indicator event from among a universal serial bus input, an auxiliary cable input, a capacitive sensor input, and an infrared proximity detection input.

20. The computer program product of claim 18, the program code further comprising program code that enables the device to provide the functionality of:

recording a first closed loop metric, from among multiple closed loop metrics, in response to execution of the first antenna switch operation;

recording a second closed loop metric, from among multiple closed loop metrics, subsequent to detecting completion of the transmission close loop tuning on the first antenna;

calculating a difference between the second closed loop metric and the first closed loop metric; and in response to the calculated difference of the second closed loop metric and the first closed loop metric being less than a predetermined hysteresis threshold, increasing a time span before triggering a subsequent execution of the first antenna switch operation by adding a time delay to postpone the subsequent execution of the first antenna switch operation, where the time delay is a calculated hysteresis time delay.

* * * * *